United States Patent [19]

Byrd et al.

[11] Patent Number: 4,767,603
[45] Date of Patent: Aug. 30, 1988

[54] PIG FOR A FLUID CONDUCTING SYSTEM

[75] Inventors: Audis C. Byrd, Duncan; Robert J. Morris, Lawton, both of Okla.

[73] Assignee: Halliburton Company, Duncan, Okla.

[21] Appl. No.: 818,851

[22] Filed: Jan. 14, 1986

[51] Int. Cl.⁴ .................. B01J 14/00; C07B 61/00
[52] U.S. Cl. ........................ 422/119; 15/104.05; 422/132
[58] Field of Search .............. 422/134, 132, 119; 134/166 C, 167 C, 168 C, 169 C; 15/104.06 R, 104.06 B

[56] References Cited

U.S. PATENT DOCUMENTS

| | | | |
|---|---|---|---|
| 2,099,723 | 11/1937 | Carver | 15/104.06 R |
| 2,283,460 | 5/1942 | Pumphrey | 15/104.06 R |
| 2,558,977 | 7/1951 | Pearson | 15/104.06 B |
| 3,725,968 | 4/1973 | Knapp et al. | 15/104.06 R |
| 3,835,889 | 9/1974 | Hyde | 15/104.06 R |
| 3,857,132 | 12/1974 | Knapp et al. | 15/104.06 R |
| 3,906,576 | 9/1975 | Knapp et al. | 15/104.06 R |
| 4,595,566 | 6/1986 | Byrd et al. | 422/134 |

FOREIGN PATENT DOCUMENTS 1397542   6/1975   United Kingdom ........ 15/104.06 B

Primary Examiner—Michael S. Marcus
Attorney, Agent, or Firm—James R. Duzan; E. Harrison Gilbert, III

[57] ABSTRACT

A pig for a fluid conducting system includes a support member, a first rim extending substantially longitudinally from an end of the support member, and a second rim extending substantially longitudinally from an opposite end of the support member. In a preferred embodiment, the pig also includes an axially located actuator, disposed beyond the first rim, for actuating a first location signal signifying the pig has reached a first predetermined location. This embodiment also includes another actuator, disposed beyond the second rim, for actuating a second location signal signifying the pig has reached a second predetermined location.

3 Claims, 2 Drawing Sheets

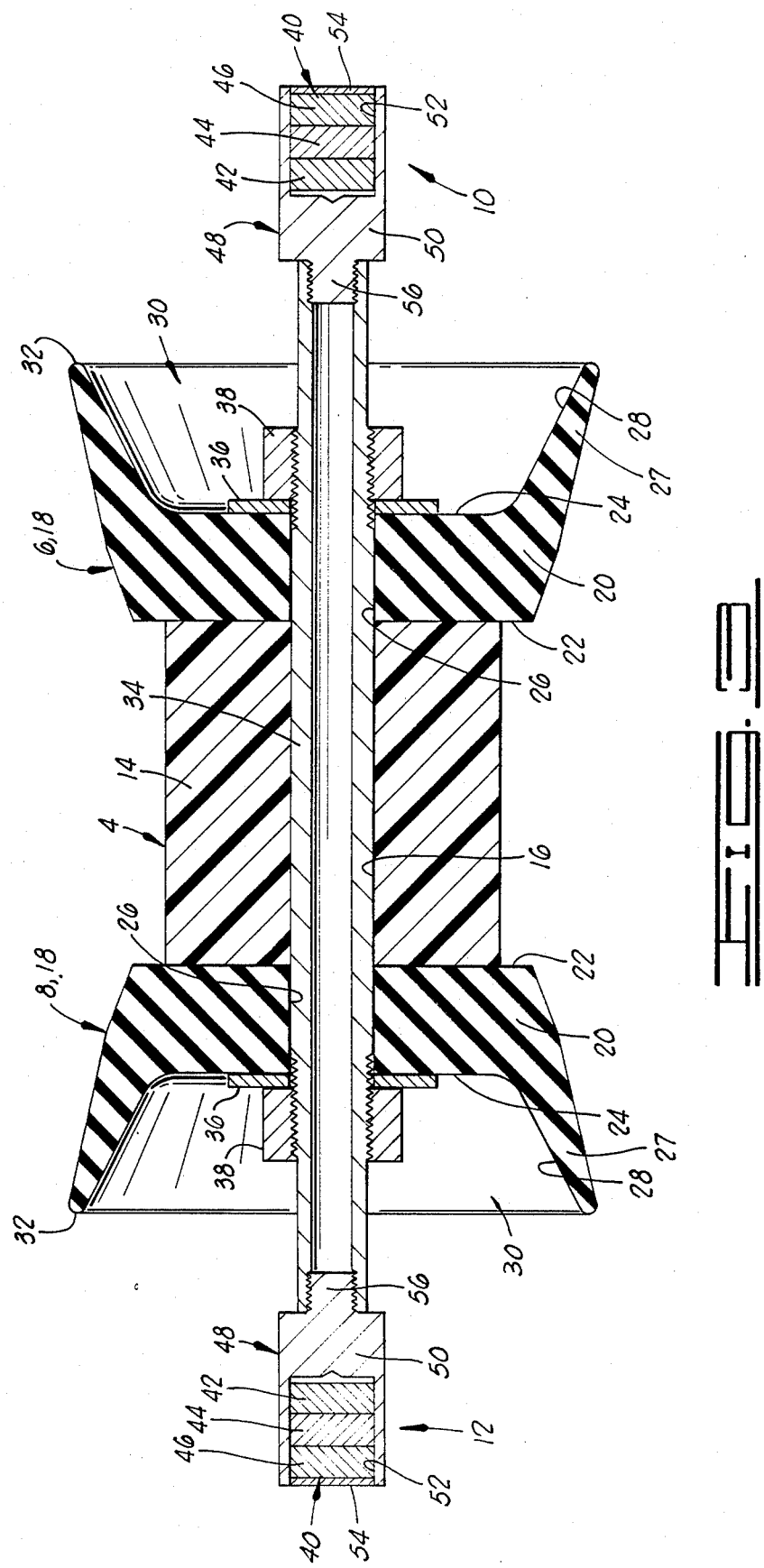

PIG FOR A FLUID CONDUCTING SYSTEM

BACKGROUND OF THE INVENTION

This invention relates generally to a pig for a fluid conducting system and more particularly, but not by way of limitation, to a pig for separating a first fluid from a second fluid in a reactor tube of a continuous reactor system wherein a polymer is reacted and ejected for flooding a hydrocarbon-bearing formation through which a well is drilled.

In a fluid conducting system, articles referred to as "pigs" are used to separate fluids moving through the system. For example, in a continuous polymer reactor system disclosed in U.S. patent application Ser. No. 615,440 now U.S. Pat. No. 4,595,566, pigs are used to separate different volumes of polymers that are moved through the tubing in the reactor system in route to being injected into a well during a tertiary hydrocarbon recovery operation. In this exemplary system, movement of the pig is bidirectional.

The general purpose of a pig used in a fluid conducting system is to provide a movable fluid-sealing barrier between the fluids. The sealing nature of such pig prevents unwanted intermingling of the separate volumes of fluid. The sealing function is also important in the exemplary reactor system because if leakage occurs across the pig, the synchronization of the flows within the reactor system can be lost.

Another function of such a pig is to provide some means of actuating a signal signifying the location of the pig. This is particularly useful in a system such as the exemplary reactor system wherein it must be determined when the pig reaches an end of a reactor tube so that valve states can be changed to reverse the direction of fluid flow, whereby the fluid volumes and the pig are moved in the opposite direction.

One type of pig which has been tried in the polymer reactor system is an article referred to as a prover ball, a substantially spherical member made of a relatively hard substance, heretofore known to be used in proving meters of fluid flow systems. When used in the reactor system described in U.S. patent application Ser. No. 615,440, the prover ball would sometimes hang up in the flanged joints and allow fluid leakage between different volumes of the polymer, thereby allowing intermingling of the polymer and losing synchronization among the timerelated volumes of moving polymers. To indicate its arrival at a predetermined location, the ball would mechanically engage and deflect a mechanical switch, which switch would ultimately become inoperative due to the highly viscous polymer leaking into the switch housing.

From the foregoing example, there is the specific need for an improved pig which more satisfactorily works in a continuous polymer reactor system to maintain proper sealing and synchronization between separate volumes of fluid. Such a pig must be bidirectionally operable for this specific use. Such a pig should also include a type of location signal actuating means which is not affected by the fluid with which the pig is used (such as the highly viscous polymer of the exemplary reactor system). Such a pig should also be, in general, adaptable for use in any suitable fluid conducting system.

SUMMARY OF THE INVENTION

The present invention overcomes the above-noted and other shortcomings of the prior art by providing a novel and improved pig for a fluid conducting system. The pig of the present invention maintains proper sealing, whereby any needed synchronization is likewise maintained, and it can be used bidirectionally. A preferred embodiment of the invention includes a location signaling means which is not rendered inoperative by highly viscous fluids, such as a polymer used in a reactor system for reacting and pumping a polymer into a well at a well site. The present invention is, however, adaptable for use in any suitable fluid conducting system.

Broadly, the pig of the present invention comprises a sealing body including a support member; a first rim, extending substantially longitudinally from an end of the support member; and a second rim, extending substantially longitudinally from an opposite end of the support member. The pig further comprises signaling means, connected to the sealing body in spaced relation from a conduit of the fluid conducting system when the pig is disposed in the conduit, for producing a characteristic from which the location of the pig in the conduit is detectable. In a preferred embodiment the signaling means includes first actuating means, connected to the support member and disposed beyond the first rim, for actuating a first location signal signifying the pig has reached a first predetermined location within the fluid conducting system; and it also includes second actuating means, connected to the support member and disposed beyond the second rim, for actuating a second location signal signifying the pig has reached a second predetermined location within the fluid conducting system.

In a specific embodiment of the pig for separating a first fluid from a second fluid in a reactor tube of a continuous reactor system wherein a polymer is reacted and ejected for flooding a hydrocarbon-bearing formation through which a well is drilled, such embodiment comprises an annular spacer member having an axial opening extending therethrough, a first seal cup having an axial aperture defined therethrough, a second seal cup having an axial aperture defined therethrough, a connector rod extending through the apertures of the first and second seal cups and through the opening of the spacer member, first fastener means for engaging both the connector rod and the first seal cup, and second fastener means for engaging both the connector rod and the second seal cup. This embodiment further comprises a first magnet, means for connecting the first magnet to one end of the connector rod, a second magnet, and means for connecting the second magnet to the other end of the connector rod.

Therefore, from the foregoing, it is a general object of the present invention to provide a novel and improved pig for a fluid conducting system. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 3 is a sectional view of the second preferred embodiment taken along line 3—3 shown in FIG. 2.

DETAILED DESCRIPTION OF THE PREFERRED EMBODIMENTS

Figure 1:
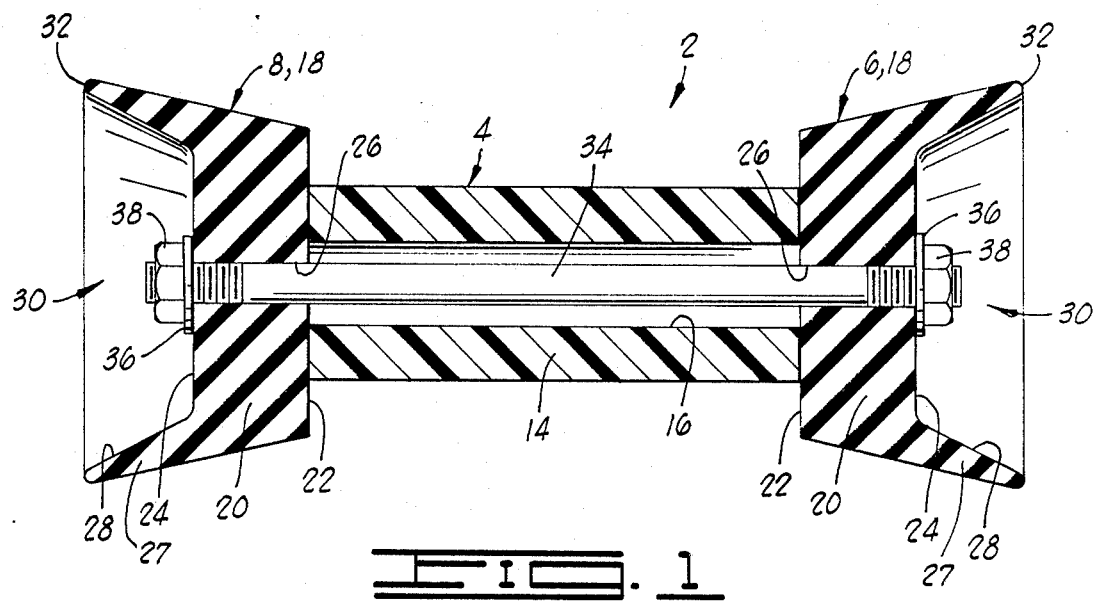
FIG. 1 is a sectional view of a first preferred embodiment of the pig.

FIG. 1 shows the basic preferred embodiment of a pig 2 constructed in accordance with the present invention. This embodiment broadly comprises a sealing body including a support member 4, a rim 6 extending substantially longitudinally from an end of the support member 4, and a rim 8 extending substantially longitudinally from an opposite end of the support member 4. This basic configuration is also part of the embodiment depicted in FIGS. 2 and 3, which second-illustrated embodiment further comprises actuating means 10, disposed beyond the rim 6, for actuating a location signal signifying the pig 2 has reached a predetermined location within the fluid conducting system within which it is used and which second-illustrated embodiment also further comprises actuating means 12, disposed beyond the rim 8, for actuating a location signal signifying the pig 2 has reached a predetermined location within the fluid conducting system. These two actuating means 10, 12 define the preferred embodiment of a signaling means, connected to the sealing body in spaced relation from a conduit of the fluid conducting system when the pig is disposed in the conduit, for producing a characteristic from which the location of the pig in the conduit is detectable. These elements will be more particularly described hereinbelow with reference to both embodiments, wherein similar elements of the two embodiments are identified by like reference numerals.

The support member 4 provides central spacer means for longitudinally spacing the rims 6, 8 from each other. The support member 4 is particularly shown as being defined by an annular wall 14 through which a longitudinal opening 16 is defined. In the preferred embodiment the opening 16 is specifically defined axially through the annular wall 14. In this embodiment, the wall 14 is made of polypropylene; however, any suitable substance can be used.

The rim 6 constitutes a seal means for providing a sealing surface at one end of the pig 2. It is specifically embodied as a flexible seal cup 18 opening longitudinally outwardly from the support member 4. The seal cup 18 includes a circular base 20 suitably connected to the support member 4. The base 20 has a surface 22 disposed adjacent an end surface of the support member 4, and the base 20 has another surface 24. Both surfaces 22, 24 extend transversely to the opening 16 defined through the support member 4. Defined axially or concentrically through the base 20 between the surfaces 22, 24 is an aperture 26.

The seal cup 18 also includes a seal member extending from the circumference of the circular base 20 at an obtuse angle relative to the central area of the circular base 20 circumscribed by the seal member. This central area is coextensive with the surface 24 in the illustrated embodiments. The seal member, itself, is a skirt defined by a side wall 27 flaring outwardly relative to the support member 4 so that an outwardly expanding contour is defined. This outwardly expanding contour flares laterally, but extends substantially longitudinally away from the support member in a first direction. In the preferred embodiment this substantially longitudinal extension is not parallel to the axis of the support member 4 but is at an acute angle thereto as established by the obtuse angular relationship between the side wall 27 and the base 20. The side wall 27 has an inner surface 28 intersecting the surface 24 and extending therefrom so that the surfaces 24, 28 circumscribe a truncated conical volume 30.

The side wall 27 terminates at an outer periphery sealingly engaging an inner surface of the conduit through which the pig 2 is moved in the first direction. This outer periphery specifically provides a flexible, and in the preferred embodiment a resilient, lip 32 that tends to fold radially outwardly and longitudinally back when the pig 2 moves through the conduit in the first direction. This folding back improves the wiping action of the pig 2 as it moves through the system.

The rim 8 is constructed identically to the rim 6 as indicated by the like reference numerals shown in the drawings. The rim 8, however, is positioned relative to the support member 4 so that the seal cup defining the rim 8 opens towards the opposite direction from which the seal cup 18 opens. Additionally, the sealing periphery of the side sealing wall of the rim 8 seals and wipes the inner surface of the conduit when moving in such opposite direction.

The support member 4 and the rims 6, 8 can be integrally formed, such as by being molded in a unitary piece. In general, however, these elements may be formed and connected by any suitable means. In the illustrated embodiments, the elements are separately made and mechanically connected together. In these embodiments, the member 4 is a polypropylene rod and the rims are the rear sealing portions cut from two separate cement plugs of known type. The seal cups defining the rims 6, 8 are connected to the polypropylene rod by suitable connector means.

This connector means in the preferred embodiment includes a connecting rod 34 extending through the axial opening 16 of the support member 4 and through the apertures 26 of the seal cups defining the rims 6, 8. The connecting rod 34 is a linear annular tube having a length greater than the length of the aligned, interconnected support member 4 and rims 6, 8.

The connector means also includes means for securing the support member 4 and the rims 6, 8 to the connecting rod 34. This particularly includes two fastener means, one for fastening the rod 34 adjacent the rim 6 and the other for fastening the rod 34 adjacent the rim 8. In the illustrated embodiments, each of these fastener means includes a flat stainless steel washer 36 and a stainless steel hex jamb nut 38 which engage the connector rod 34 and the respective seal cup of the respective rim 6, 8. The washer 36 lies adjacent an area of the surface 24 and the jamb nut 38 lies adjacent the opposite surface of the washer 36.

Figure 2:
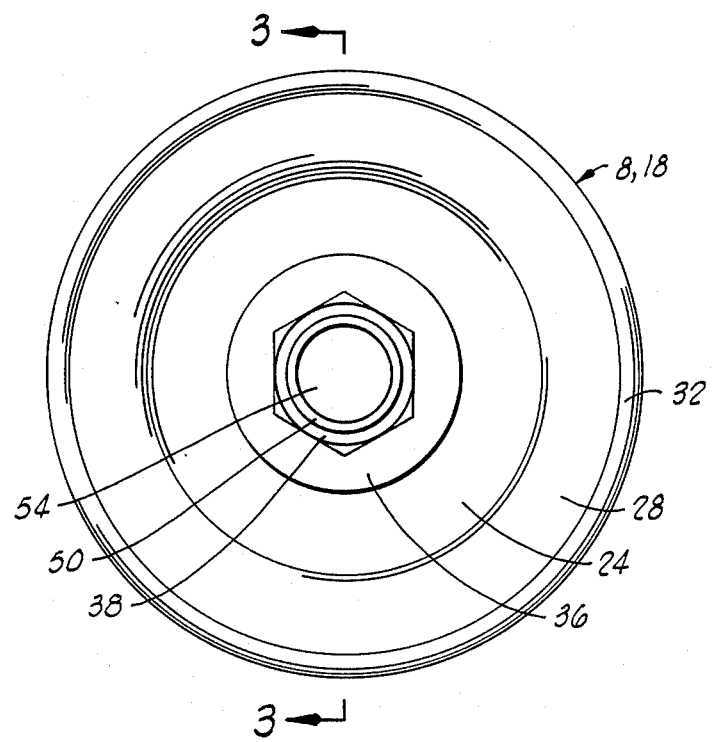
FIG. 2 is an end view of a second preferred embodiment of the pig.

Attached to the support rod 34 in the preferred embodiment shown in FIGS. 2 and 3 are the two actuating means 10, 12. The actuating means 10 is attached so that it is disposed longitudinally beyond the seal cup 18 defining the rim 6, whereby the actuating means 10 of the preferred embodiment is outside the truncated conical volume 30 circumscribed by the surfaces 24, 28 of the respective seal cup. The actuating means 12 is similarly disposed but beyond the opposite end of the pig 2 outside the truncated conical volume circumscribed by the seal cup defining the rim 8.

The actuating means 10 includes a magnetic element 40, specifically defined in the preferred embodiment by three disk magnets 42, 44, 46 axially aligned to form a cylindrical magnetic body.

The actuating means 10 also includes means for connecting the magnet element 40 to one end of the connector rod 34. As best shown in FIG. 3, this connecting means includes a housing 48 made of a magnetically permeable material and having the magnet element 40 retained therein. The housing 48 includes a cylindrical body 50 having an open ended cavity 52 defined therein for receiving the magnets 42, 44, 46. The magnets are held in the cavity by suitably closing the open end of the cavity 52, such as by applying a layer 54 of an epoxy adhesive, once the magnets have been placed in the cavity. The housing 48 also includes a smaller diameter cylindrical stem 56 extending longitudinally and coaxially from the body 50. The stem 56 is received into the respective end of the connector rod 34 whereby the housing 48 is attached to the rod 34 at a position beyond the end of the rim 6. In the preferred embodiment the housing 48 is also attached to the rod 34 so that the magnets 42, 44, 46 are coaxially disposed relative to the support member 4 and the two rims 6, 8 so that the magnets maintain a constant central positional relationship regardless of the rotational orientation of the pig 2. That is, the magnets 42, 44, 46 are intended to be maintained in a coaxial position along the conduit through which the pig 2 moves so that the magnets will maintain a uniform magnetic field relative to the circumference of the conduit regardless of the rotational disposition of the pig 2. If the magnets 42, 44, 46 were axially offset, they would be closer to one portion of the conduit, which portion would change depending upon the rotational orientation of the pig 2 in the conduit.

The second actuating means 12 is constructed the same as the first actuating means 10 as indicated by like reference numerals; however, the second actuating means is disposed beyond the opposite seal cup defining the rim 8.

In operation of the present invention, one specific contemplated use is for separating a first fluid from a second fluid in a reactor tube of a continuous reactor system wherein a polymer is reacted and ejected for flooding a hydrocarbon-bearing formation through which a well is drilled. In this environment, one volume of fluid acts on the seal cup defining the rim 8 to drive the pig in one direction. During movement in this direction, the lip 32 of the seal cup defining the rim 6 seals against the inner surface of the reactor tube and tends to fold back to wipe the surface of the tube so that a full cross section of the fluid adjacent the rim 6 is moved in such direction. Because of the identical or symmetrical construction of the pig 2, a similar action occurs when the fluid adjacent the rim 6 acts to move the pig 2 in an opposite direction, whereby the lip 32 of the seal cup defining the rim 8 provides the sealing and wiping action.

When the pig 2 reaches a predetermined location where a magnetically responsive element is located, the respective actuating means leading in the direction of movement activates such responsive element to generate a location signal signifying the pig 2 has reached the location. Such a signal can be used, for example, to reverse the direction of fluid flow whereby the fluid then pushes the pig 2 in the opposite direction. This type of magnetic actuating means is not affected by highly viscous fluids, such as polymers pumped into a well, because the means acts magnetically through the conduit so that no switch arm need be inserted into the conduit for mechanical actuation, thereby precluding any switches being gummed up by leaked fluid.

Although the preferred embodiments have been described with reference to a continuous polymer reactor system, it is contemplated that the present invention can be used in other specific environments. For example, the pig 2 could have application in proving meters in a manner similar to the prover balls referred to hereinabove.

In general summary, the present invention is directed to a bidirectionally operable pig which can seal in either direction of linear movement. The pig also preferably can provide a scraping action along the conduit through which it is used. The pig has a sealing body that can be integrally or unitarily constructed, such as by molding, or one that can be mechanically assembled of separable components.

In particular embodiments the pig also includes signaling means by which the location of the pig in the conduit can be detected. The signaling means has been shown to include, in at least one embodiment, two magnets connected to a central rod. Other constructions can be used. For example, in a unitary or integral sealing body, threaded inserts can be embedded in the body at opposite ends of the support member portion thereof for receiving separate connectors for each of the two magnets.

It is also contemplated that the signaling means need not necessarily be embodied as magnets. Generally, it is contemplated that one could use any suitable component which does not require a mechanical connection or contact with the conduit or a mechanical element (such as a mechanical switch) associated with the conduit, but which can be detected outside or across or through the conduit or fluid conducting system. Such non-mechanical means avoids the interference problems that can result from the fluid being moved through the system. One particular class of suitable components includes flux producing means for naturally producing a flux providing the signaling characteristic which is detectable externally of the conduit. Such a class includes, for example, the aforementioned magnets, which in the illustrated embodiment are permanent magnets naturally producing a magnetic flux, and a suitable radioactive material, which naturally produces a radiation flux. Such signaling means can be contained within the composition or boundaries of the sealing body or it can extend beyond. For example, the illustrated magnets are disposed beyond the ends of the sealing body; however, they can be otherwise disposed relative to the sealing body. As another example, a radioactive material could be contained in parts of the sealing body or throughout it.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. In combination a continuous reactor system and a pig for separating a first fluid from a second fluid in said continuous reactor system, said system having a reactor tube with an interior wall defining a volume wherein a polymer is reacted and rejected, said polymer being formed from said first fluid and said second fluid when in said reactor tube, said pig comprising a sealing body, said sealing body including:
  a support member;
  a first rim, extending substantially longitudinally from an end of said support member, said first rim including a side wall having a smooth outer surface, flaring outwardly relative to said support member so that an outwardly expanding contour is defined, said outwardly expanding contour extending substantially longitudinally away from said support member in a first direction, said side wall of said first rim terminating at its outermost portion in a flexible circumferential lip sealingly, scrapingly engaging a portion of said interior wall of said reactor tube of said continuous reactor system by folding radially outwardly and longitudinally back when said sealing body of said pig is moving therethrough in a first direction to remove by wiping said polymer which has been reacted from said first fluid from said interior wall of said reactor tube of said continuous reactor system as said pig moves therethrough in said first direction;
  a second rim, extending substantially longitudinally from an opposite end of said support member, said second rim including another side wall having a smooth outer surface, flaring outwardly relative to said support member so that another outwardly expanding contour is defined, said another outwardly expanding contour extending substantially longitudinally away from said first support member in a second direction opposite said first direction, said another side wall of said second rim terminating at its outermost portion in another flexible circumferential lip sealingly engaging a portion of said interior wall of said reactor tube of said continuous reactor system by folding radially outwardly and longitudinally back when said sealing body of said pig is moving therethrough in a second direction to remove by wiping said polymer which has been reacted from said second fluid from said interior wall of said reactor tube of said continuous reactor as said pig moves therethrough in said second direction,
  wherein said pig maintains initial rotational orientation during movement through said reactor tube; and
  signalling means, connected to said sealing body, of said pig in spaced relation from said interior wall of said reactor tube of said continuous reactor system when said sealing body of said pig is disposed in said reactor tube of said continuous reactor system, for producing a characteristic from which the location of said sealing body of said pig in said reactor tube of said continuous reactor system is detectable, said signaling means including:
    first actuating means, connected to said support member adjacent said first rim, for actuating a first location signal indicating that said sealing body of said pig has reached a predetermined location in said reactor tube of said continuous reactor system; and
    second actuating means, connected to said support member adjacent said second rim, for actuating a second location signal indicating that said sealing body of said pig has reached a predetermined location in said reactor tube of said continuous reactor system.

2. A pig as defined in claim 1, wherein said signaling means includes flux producing means for naturally producing a flux detectable externally of said reactor tube.

3. A pig as defined in claim 1, wherein said first and second actuating means are coaxially disposed relative to said support member and said first and second rim so that said first and second actuating means maintain a constant central positional relationship regardless of the rotational orientation of said pig.

* * * * *